United States Patent [19]

Sienkiewicz et al.

[11] 4,449,906
[45] May 22, 1984

[54] EXTRUSION NOZZLE ARRANGEMENT

[75] Inventors: Boleslaw Sienkiewicz, Pearl River; Franklin Kramer, Briarcliff Manor, both of N.Y.; Imrich Klein, Highland Park, N.J.; C. G. Peter Oldershaw, Halifax, Canada; Locus Y. Chuang, Plainsboro, N.J.

[73] Assignee: General Foods Corporation, White Plains, N.Y.

[21] Appl. No.: 383,908

[22] Filed: Jun. 1, 1982

[51] Int. Cl.³ ............................................. B29F 3/04
[52] U.S. Cl. ................................ 425/131.1; 264/171; 425/192 R; 425/376 A; 425/382 R; 425/466; 425/467; 426/513; 426/516; 426/802
[58] Field of Search .............. 425/190, 192 R, 131.1, 425/382, 376 A, 466–467; 264/171; 426/104, 512, 513, 516, 802

[56] References Cited

U.S. PATENT DOCUMENTS

| | | | |
|---|---|---|---|
| 1,083,275 | 1/1914 | Eberhard | 264/75 |
| 1,603,812 | 10/1926 | Stein | 264/171 |
| 2,572,833 | 10/1951 | Balzarini | 426/516 |
| 2,771,366 | 11/1956 | Shadid | 426/513 |
| 2,897,541 | 8/1959 | Orsini | 264/75 |
| 3,032,008 | 5/1962 | Land et al. | 425/382 R |
| 3,482,278 | 12/1969 | Thompson et al. | 425/382 R |
| 3,505,085 | 4/1970 | Straughn et al. | 425/208 |
| 3,834,849 | 9/1974 | Supran et al. | 425/461 |
| 3,970,761 | 7/1976 | Wenger et al. | 426/802 |
| 4,005,962 | 2/1977 | Kobee | 425/382 R |
| 4,042,715 | 8/1977 | Wenger et al. | 426/104 |
| 4,060,998 | 12/1977 | Bernard | 426/516 |
| 4,099,455 | 7/1978 | Wenger et al. | 425/131.1 |
| 4,118,164 | 10/1978 | Wenger et al. | 425/202 |
| 4,124,339 | 11/1978 | Bernard | 425/382 R |
| 4,125,635 | 11/1978 | de Ruyter | 425/208 |
| 4,185,123 | 1/1980 | Wenger et al. | 426/802 |
| 4,200,959 | 5/1980 | Cheney | 426/513 |
| 4,217,322 | 8/1980 | Sugano et al. | 425/133.5 |
| 4,283,168 | 8/1981 | Miller et al. | 425/466 |
| 4,322,202 | 3/1982 | Martinez | 425/376 A |
| 4,358,468 | 11/1982 | Dolan et al. | 426/104 |
| 4,372,734 | 2/1983 | Dolan et al. | 426/802 |
| 4,372,739 | 2/1983 | Vetter et al. | 425/376 A |

Primary Examiner—Jeffery R. Thurlow
Attorney, Agent, or Firm—T. R. Savoie; D. J. Donovan

[57] ABSTRACT

An extrusion nozzle arrangement for the production of a product such as a comestible, including a multiple nozzle arrangement through which there can be fabricated a multi-layered slab of a meat analogue product. A bacon-like appearance is achieved in that each extrusion nozzle includes a narrow, elongate bottom outlet orifice arranged to extend transversely above a continually moving horizontal conveyor belt. An insert strip is arranged within the nozzle above the orifice and coextensive with the length thereof, which includes projections extending across the path of flow of the solution extruded through the orifice, with such projections being positioned in a predetermined manner along the insert strip as to cause either restrictions or directional changes in the flow of the solution egressing from the nozzle orifice. An arrangement of a plurality of extrusion nozzles spaced in parallel relationship along the path of movement of the conveyor belt and extending transversely across the conveyor belt, sequentially extrudes layers formed from different solutions constituting components of the meat analogue product in superposition upon the layer extruded by the preceding nozzle to thereby form a multi-layered slab. By selecting the configuration of the flow restricting or redirecting pattern of the insert strip of each subsequent nozzle to compensate for the variations in the layer configuration produced by the insert strip of the preceding nozzle, a predetermined random pattern can be established between each of the extruded superimposed layers.

16 Claims, 9 Drawing Figures

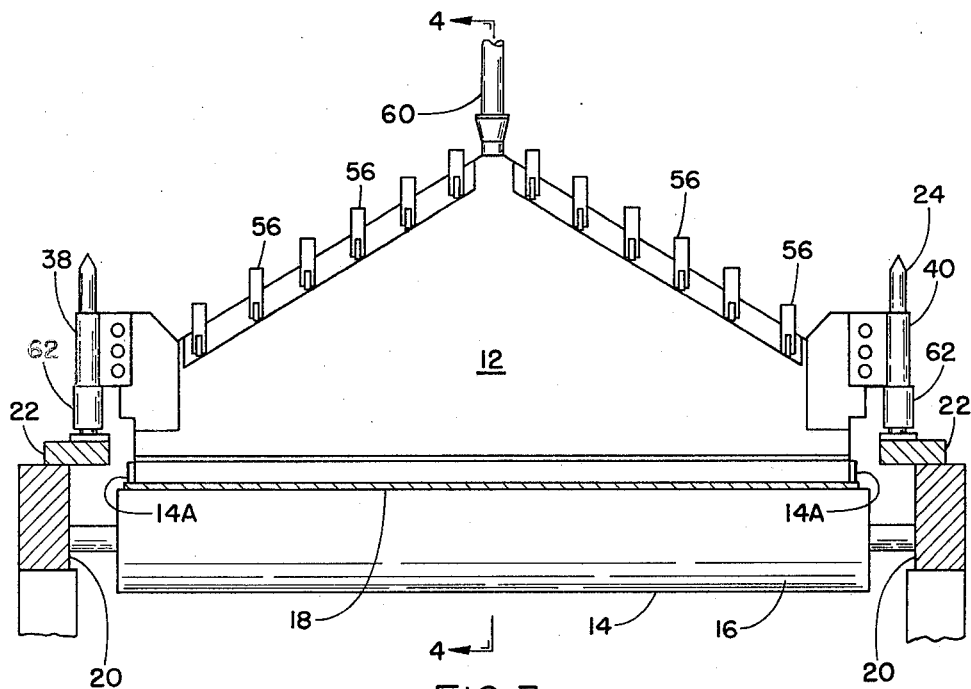
FIG. 3
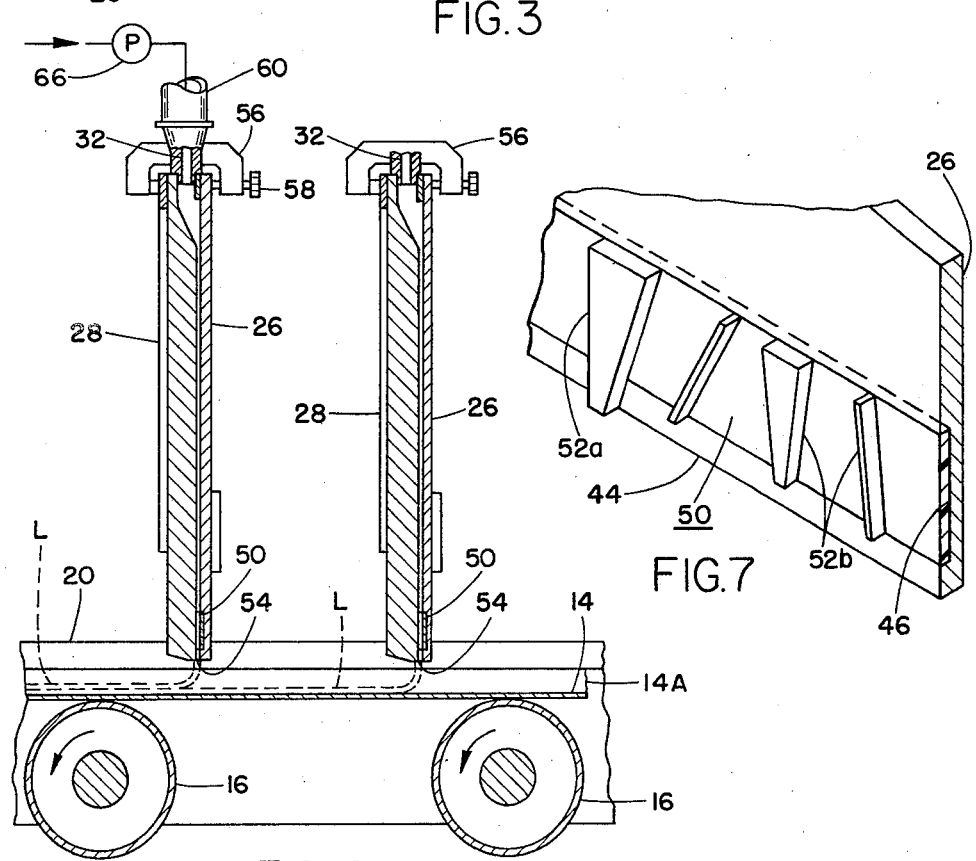
FIG. 4
FIG. 7

EXTRUSION NOZZLE ARRANGEMENT

BACKGROUND OF THE INVENTION

1. Field of the Invention

The present invention relates to an extrusion nozzle arrangement and to a method for the production of an extruded product and, more particularly, to a novel multiple nozzle arrangement and method through which there can be fabricated a comestible such as, for example, a multi-layered slab of a meat analogue product, wherein the extrusion of a solution, slurry or emulsion through the nozzle orifice can be controlled so as to provide for an extruded layered product resembling natural bacon in its appearance.

Although the invention is contemplated for utilization in the fabrication of various types of products, it has particular application to the formation of a comestible, such as a bacon-like meat analogue, wherein a plurality of solutions, emulsions or slurries, some of which may have differing rheological properties and consistencies, are extruded through separate nozzles to form a multi-layered slab internally configured to provide a random pattern simulating natural bacon.

In essence, the bacon-like appearance is achieved in that each inventive extrusion nozzle includes a narrow, elongate bottom outlet orifice arranged to extend transversely above a continually moving, essentially horizontal conveyor belt, and wherein the extruded layer of solution, slurry or emulsion which is a constituent of the meat analogue product is extruded through the orifice at relatively low pressures and temperatures and deposited onto a conveyor belt in the form of a continuous layer. In order to impart a predetermined or patterned configuration to the cross-section of the solution layer which is extruded onto the conveyor belt, an insert strip is arranged within the nozzle above the orifice and coextensive with the length thereof, which includes projections extending across the path of flow of the solution or slurry extruded through the orifice, with such projections being positioned in a predetermined manner along the insert strip and dimensioned to produce either restrictions or directional changes in the flow of the extrudate egressing from the nozzle orifice. An arrangement of a plurality of extrusion nozzles spaced in essentially parallel relationship along the path of movement of the conveyor belt and extending transversely across the conveyor belt, sequentially extrudes layers formed from different solutions, slurries or emulsions constituting components of the meat analogue product in superposition upon the layer extruded by the preceding nozzle to thereby form a multi-layered slab. By selecting the configuration of the flow restricting or redirecting pattern of the insert strip of each subsequent nozzle to compensate for the variations in the layer configuration produced by the insert strip of the preceding nozzle, a predetermined random pattern can be established between each of the extruded superimposed layers so as to thereby simulate the random pattern of the internal fibers and constituents of natural bacon, or any other type of pattern representative of a product or comestible which is simulated through the present invention.

Although numerous extrusion apparatuses and nozzles, and various processes for producing meat analogue products and similar comestibles are currently known, these are generally complex and expensive in nature; requiring numerous moving structural parts which are readily subject to wear and, consequently, are of a relatively short life-expectancy; as well as requiring greater maintenance and move time and/or labor for cleaning. Moreover, with these structural parts it is frequently difficult to maintain the necessary degree of accuracy.

2. Discussion of the Prior Art

Thus, among apparatuses and methods relating to the fabrication of meat analogue products through extrusion is that disclosed in Wenger et al. U.S. Pat. No. 4,099,455 in which a vegetable protein-water mixture or emulsion is treated and then extruded through the intermediary of various screw-type extruding devices and nozzle arrangements. These arrangements are of a relatively complex nature requiring numerous moving parts which render the apparatus and method expensive and cumbersome. Moreover, the meat analogue product produced through this method does not afford the degree of controllability over the interior structure and appearance of the meat analogue product for precise simulation of the natural product, such as sliced bacon.

Similarly, Wenger et al. U.S. Pat. No. 3,970,761 disclose a method of extruding a vegetable protein based meat analogue product which, analogous to Wenger et al. U.S. Pat. No. 4,099,455, does not afford the degree of control over the appearance of the meat analogue product as a natural food, while concurrently necessitating the use of complex apparatus in effectuating the extrusion method.

Jernigan U.S. Pat. No. 3,724,984 discloses an extrusion apparatus in which a confection may be mixed within a nozzle to a desired degree. This apparatus would not appear to be unduly applicable to the fabrication of a meat analogue product possessing the controlled internal pattern which will simulate natural bacon.

Bone et al. U.S. Pat. No. 4,235,935 disclose a method and apparatus for producing a continuous strip of simulated bacon in which three differently colored doughs are combined into a strip containing three or more distinct differently colored zones, wherein such simulation of natural bacon is afforded by an emulsion which is unstable during cooking and which will distort the individual strips to simulate a random internal coloring pattern normally found in natural sliced bacon. Again there is no disclosure of an extrusion nozzle arrangement or method which will provide for the controlled patterning of the meat analogue product to precisely simulate natural bacon.

Ziminski et al. U.S. Pat. No. 4,197,324 merely disclose the fabrication of a meat-like product such as natural bacon, by providing alternating zones simulating lean and fat strata and which the variations in appearance between the layers are produced during the cooking and resultant crinkling of the product.

Cheney U.S. Pat. No. 4,196,222 discloses a process for the preparation of meat and bacon analogues wherein the combination of various phases in a random manner can be effected to simulate the internal composition and physiology of natural cooked bacon. There is no disclosure of any nozzle structure which will impart the natural appearance to a bacon-like meat analogue product in a controlled random manner without the utilization of moving mechanical components, such as stirrers, during the extrusion of the individual layers of the bacon analogue product slurry.

Ziminski et al. U.S. Pat. No. 4,166,138 merely disclose dough being shaped into a flat ribbon adapted to resemble a bacon-like product, in which random coloring of the product is effected by mixing colored and uncolored doughs intermittently or periodically in a generally random manner. This process does not provide for the separate extrusion of a plurality of layers representing individual lean and fat strata in bacon strips which are thereafter adapted to be combined into a slab which is then processed into individual natural bacon-simulating strips.

SUMMARY OF THE INVENTION

Accordingly, in order to overcome or ameliorate the shortcomings and disadvantages encountered in the prior art, the present invention relates to an extrusion nozzle arrangement and a method for the extruding of a meat analogue product resembling natural bacon which is simple in construction and operation and requires practically no moving parts to thereby render the arrangement and method inexpensive, simple and reliable in use. Although described in connection with a meat analogue product, the invention is readily applicable to other types of products, either comestible or non-comestible.

The foregoing object is achieved through the provision of an extrusion nozzle constructed pursuant to the invention, which includes generally vertical front and back plates sealingly clamped together to form a flow space therebetween. A solution or slurry constituted of an emulsion forming one component of a meat analogue product is fed through an inlet at the upper end of the nozzle into the space between the nozzle plates and conducted downwardly while expanding through the so called "coat anger" shaped nozzle towards a narrow, elongate bottom orifice. The orifice is to extend above and transversely across a horizontal movable conveyor belt onto which the slurry is extruded from the orifice in the shape of a continuous layer. Although the layer is continuous in the direction of movement of the movable conveyor belt onto which it is deposited, it can be interrupted or discontinuous across the width of the belt since it can be interrupted when extruded from the nozzle. In order to impart a extruded layer, an insert strip is arranged within the nozzle coextensive with the length of the orifice and including projections extending across the flow path of the emulsion being extruded. These projections cause the flow of the solution, emulsion or slurry to deviate or be constricted at various preselected random locations along the length the orifice to thereby impart a predetermined or varying sectional configuration to the solution as it is being extruded from the nozzle orifice and deposited onto the conveyor belt.

In a particular aspect of the invention, a plurality of nozzles are positioned along the path of movement of the conveyor belt in essentially parallel spaced relationship and extending transversely of the conveyor belt, whereby each nozzle is adapted to superimpose an extruded layer upon the layer extruded from a precedent nozzle. Through the provision of different solutions or emulsions for each subsequent layer, it is possible to simulate the various or alternating internal lean and fat strata of a meat analogue product, such as natural bacon. Concurrently, the insert strips arranged within each nozzle cause the flow through the orifice to configure the extruded layer so as to vary in a predetermined manner whereby each subsequent nozzle has the extruded layer formed thereby compensating for either the reduction or thickening in the cross-section of the precedingly extruded layer, thereby establishing a pattern not only as to the lean and fat strata of the meat analogue product, but simultaneously producing a "random" effect within the strata of the superimposed layers which will closely simulate that of natural bacon. The novel design of these nozzles not only ensures the formation of a predetermined pattern within the layered slab but also ensures close control of total bed height across the belt, thereby assuring good weight control and adaptability of the slab to subsequent process steps, such as, for example, slicing.

Another aspect of the present invention resides in the insert strips being arranged within each of the extrusion nozzles to form flow directing or restricting devices, and which are clamped between the front and back plates of the nozzle structure, and which are not subjected to any wear due the absence of moving parts. Moreover, the insert strips may be readily interchanged and replaced by other similar inserts strips in order to vary the configuration of the layer extruded from any particular nozzle. The ready interchangeability of the insert strips, and the simple nozzle construction itself renders the entire arrangement easy to service, maintain and clean.

An important aspect of the invention may be ascertained in that the extrusion nozzles, which are of the so called "coat hanger" type, are usually employed in extruding products at pressures in the range 1,000 to 10,000 psi, are satisfactorily utilized herein at low temperatures and low pressures of from 1 to 5 psi, depending upon the viscosities and rheological properties of the product being extruded.

BRIEF DESCRIPTION OF THE DRAWINGS

Reference may now be had to the following detailed description of a preferred embodiment of the novel and inventive extrusion nozzle and its arrangement in combination with other nozzles, taken in conjunction with the accompanying drawings; in which:

FIG. 3 is a sectional view taken along the line 3—3 in FIG. 2;

FIG. 4 is a sectional view taken along line 4—4 in FIG. 3;

FIG. 7 is a fragmentary perspective view, on an enlarged scale, of the insert strip positioned in the nozzle front plate;

DETAILED DESCRIPTION

Figure 1:
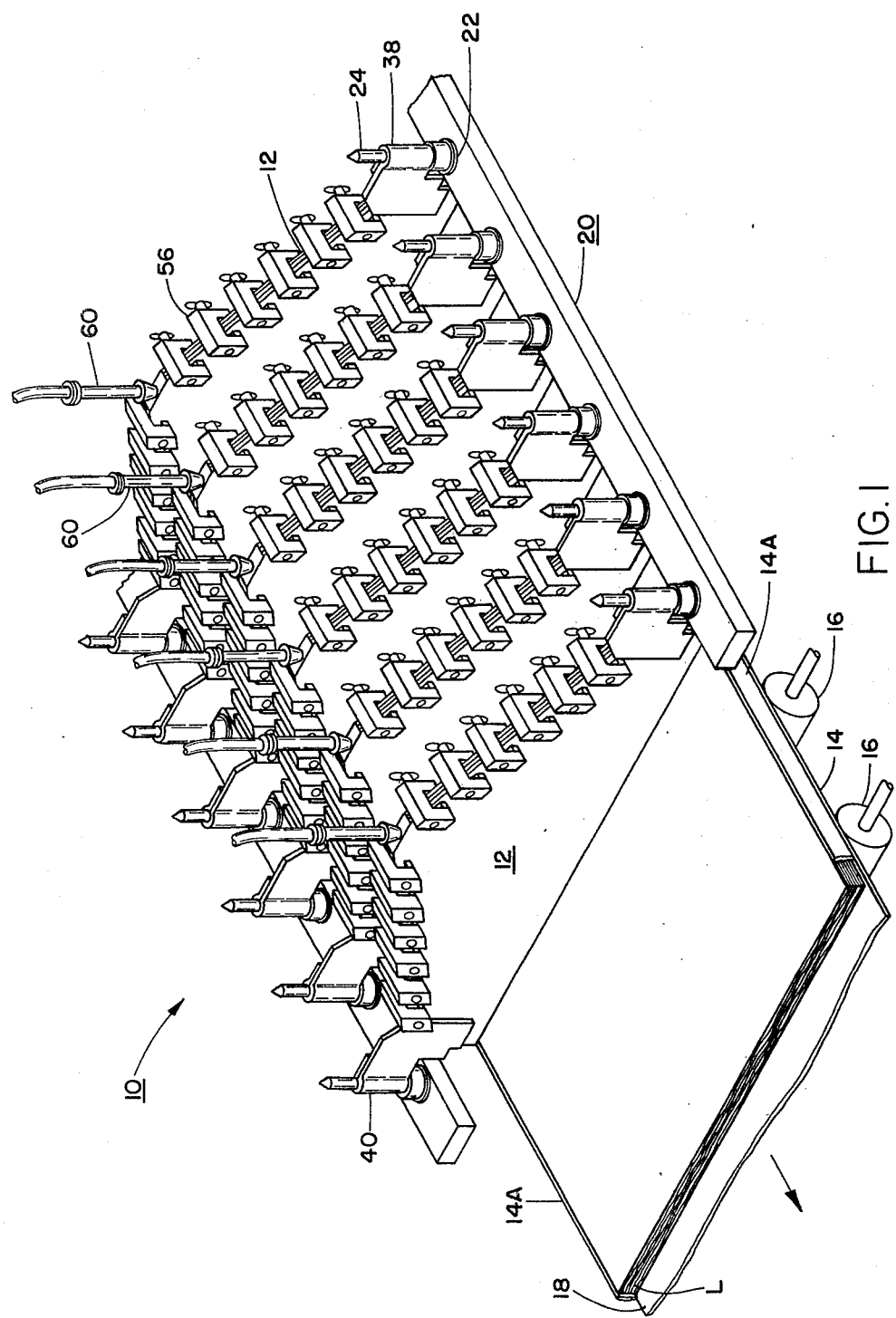
FIG. 1 illustrates a generally schematic perspective view of an arrangement of extrusion nozzles for forming a bacon-like meat analogue product.
Figure 2:
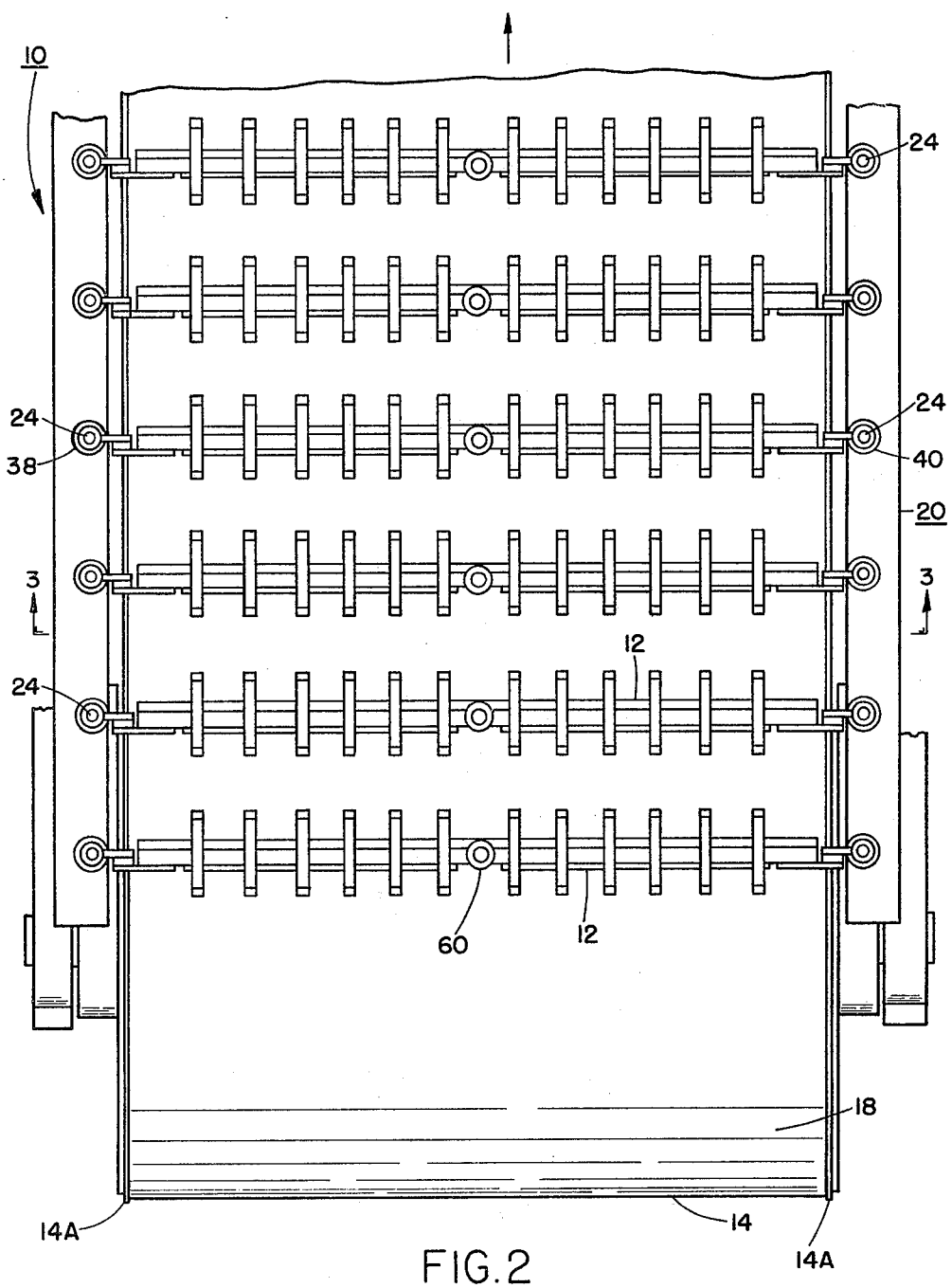
FIG. 2 is a top plan view of the arrangement of FIG. 1.

Referring now in detail to the drawings, FIG. 1 illustrates an extrusion nozzle assembly 10 consisting of a plurality of extrusion nozzles 12, and which is particularly adapted for the fabrication of a meat analogue product simulating natural bacon.

In essence, the extrusion nozzle assembly 10, in this instance consists of six spaced nozzles 12 transversely extending in parallel spaced relationship above a continually moving conveyor belt 14 which is adapted to have the extruded solution from the nozzle 12 deposited thereon in continuous superimposed layers L. When referring to a solution being extruded, this readily encompasses any flowable material, including slurries, emulsions, foams and high-viscosity liquids or the like, which may or may not incorporate particulate solids.

As is illustrated in FIGS. 1 and 4, the conveyor belt 14 is supported on rollers 16 so as to form a generally horizontal support surface 18 for the meat analogue product. At each edge of the belt 14 there is riveted an upstanding strip 14A, preferably of rubber, which will prevent the extruded material from running off the sides of the belt. The rivet holes may be plugged with a suitable material. Extending along both sides of the conveyor belt 14 is a stationary support frame arrangement 20 which includes a plurality of spaced brackets 22 each having an upstanding pin 24 fixed thereon for the mounting and support of the individual nozzles 12, as described hereinbelow.

Each extrusion nozzle 12 includes a substantially flat front plate 26 and a back plate 28 which are adapted to be assembled in a generally vertical position, and which are provided with a socalled "coat hanger" configuration. Thus, each of the plates 26, 28 has downwardly sloping or tapered top edges and a planar horizontal bottom boundary defining the edges of an orifice.

Figure 5:
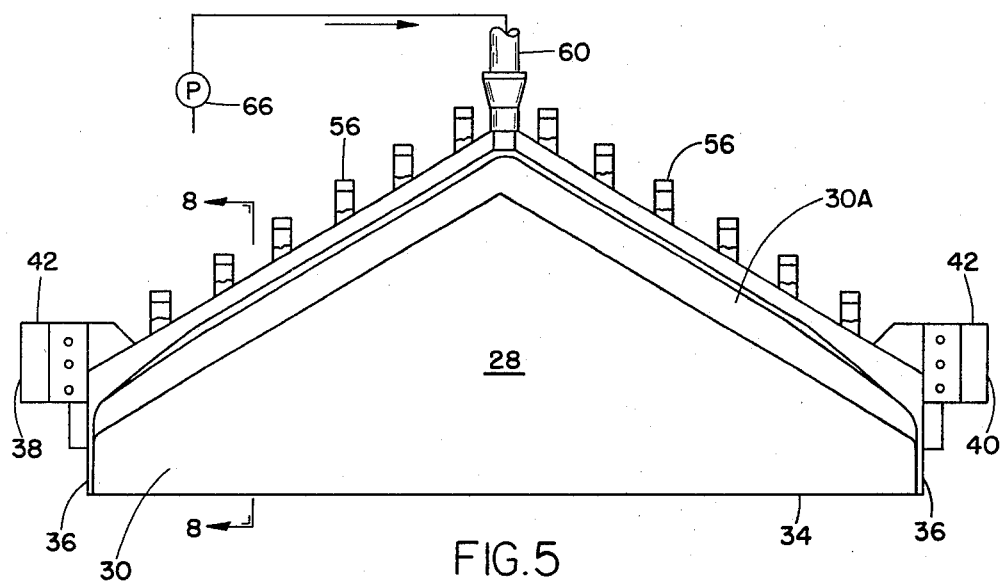
FIG. 5 is an elevational view of the nozzle back plate shown from interiorly of the nozzle.
Figure 6:
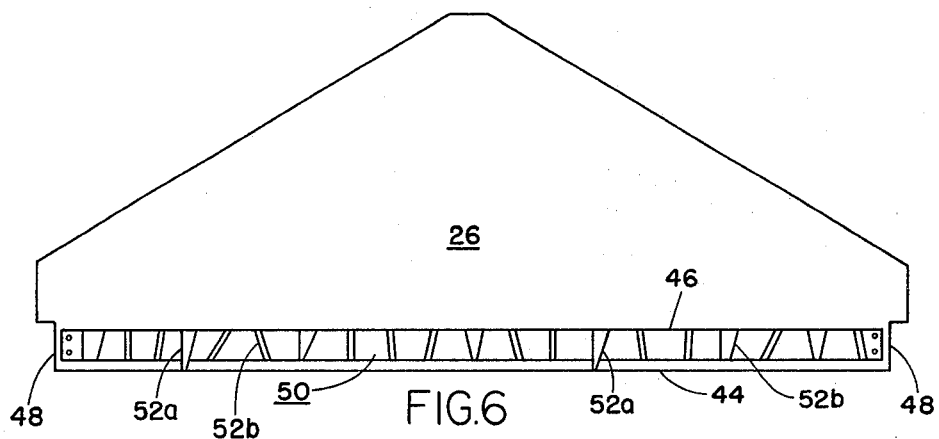
FIG. 6 is an elevational view of the nozzle front plate including the insert strip positioned therein viewed from the interior of the nozzle.
Figure 8:
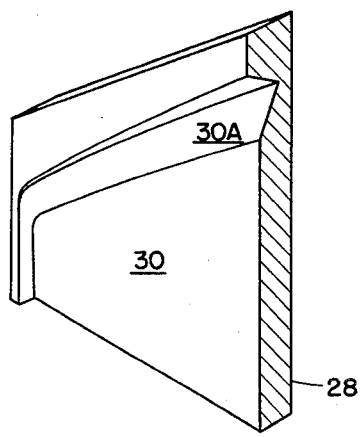
FIG. 8 is a fragmentary sectional view, on an enlarged scale, taken along line 8—8 in FIG. 5.

The back plate 28, as shown in FIG. 5, includes an internal recessed portion 30 or cavity which extends from an upper circular inlet aperture 32 and widens downwardly in a generally inverted V-shaped tapered configuration to a side 30A between cavity 30 and aperture 32 to a wide bottom opening 34 extending over practically the entire width of the back plate 28, with the exception of narrow side walls or ledge portions 36 which provide for sealing contact with front plate 26 when the plates 26 and 28 are assembled.

Attached to back plate 28, on each side thereof, are brackets 38 and 40, which may be bolted or welded to the plate, and which include vertical through-bores 42 spaced relative to each other at the same spacing as the pins 24 on the opposite sides of the support frame structure 20.

The front plate 26 is generally coextensive in its peripheral outline with the back plate 28. At the lower end of the plate 26, immediately above the bottom 44, the plate is provided with an elongate recess 46 extending over substantially the width of the front plate 26 with the exception of end walls 48 which are adapted to be contacted by the walls 36 of the back plate 28 to thereby form a sealing contact along the sides between the two plates 26 and 28, and with the upper surface edge portions of the back plate 28 sealingly contacting the surface of plate 26. If desired, a sealing gasket (not shown) may be provided between plates 26, 28 extending along wall portions 36. However, at the relatively low operating pressures utilized for the nozzles, metal-to-metal surface contact is generally adequate to allow for sealing therebetween.

As illustrated more specifically in FIG. 7 of the drawings, the recess 46 in the front plate 26 is adapted to receive an insert strip 50 which, preferably, is formed of a plastic material, such as Lexan (Registered Trademark), although if desired the strip may also be formed of any other suitable material, such as stainless steel or the like, and which includes projections or protuberances 52a and 52b extending into the flow path of material conveyed from aperture 32 through tapered distributing channel 30A into cavity 30 between plates 26, 28 downwardly out through a narrow elongate orifice 54 formed along the lower ends of the plates 26, 28 by the bottom of cavity 30 of the back plate 28, in essence, between the bottom edges 34 and 44 of the nozzle plates. The projections 52a, 52b may form either restrictions or flow directing passageways for any solution or slurry material extruded through the orifice 54 so as to produce a layer from the extruded solution which has a configuration dependent upon the positioning of the projections. The lengthier projection or projections 52a may extend to the orifice 54 so as to cause a restriction or division in the flow of the solution, whereas the shorter projections 52b serve primarily to redirect the flow of the material prior to being extruded through the orifice 54. When assembled between the front and back plates 26, 28, as illustrated in FIG. 4 of the drawings, the insert strip 50 is clamped in the recess 46 while the flow of material downwardly through cavity 30 and out of the orifice 54 passes through the gaps formed between the projections 52a, 52b which are spaced across the full width of the gap formed by cavity 30 between the plates 26, 28.

The front and back plates 26, 28 may be clamped together through the intermediary of a plurality of C-clamps 56 which are spaced along the upper tapered edges of the plates, and which are fastened by locking set screws 58. Moreover, a locating pin may extend through each of the brackets 38, 40 in the back plate 28 to engage, if desired, a suitable aperture formed in the front plate. Alternatively, the nozzle plates 26, 28 may be clamped together by means of bolts passing through suitable apertures in the plates and having locking nuts threaded thereon. The plates may also be clamped through screws which pass through openings in one plate and are screwed into threaded openings in the other plate. It is also possible to contemplate the provision of clamping flanges or other suitable fasteners well known in the art for detachably interconnecting the plates 26, 28.

The inlet aperture 32 formed in the upper end of the back plate 28, which communicates with the interior or cavity 30 of the nozzle 12, is connected to a conduit 60 which, through suitable piping connects to a supply source for a solution, emulsion or slurry forming one component of a meat analogue product which is to be fabricated by the nozzles. Interposed in each of the conduits 60 may be a suitable positive displacement pump 66, the function of which is described hereinbelow, for imparting a predetermined pressure and flow to the solution being conducted to the nozzles from the material supply source.

Each of the extrusion nozzles 12 is mounted above the conveyor belt 14 by superimposing the brackets 38, 40 upon the upstanding pins 24 on each side of the conveyor belt, with the lower edges of the brackets 38, 40 resting on suitable bushing 62 imparting the desired elevation or spacing to the orifice 54 of each nozzle 12 above the conveyor belt 14.

Inasmuch as each subsequent extrusion nozzle 12 should be elevated or raised by an amount corresponding to the thickness of the extruded layer from a precedent nozzle, the bushings 62 of each subsequent extrusion nozzle 12 may be increased in height by that specific amount or, alternatively, a suitable spacer ring or insert bushing may be provided which will compensate for the difference in elevation.

The operation of the extrusion nozzle arrangement 10 is essentially as follows:

Each of the nozzles 12 is supplied from a suitable source of supply (not shown) with a continuous flow of a slurry or emulsion constituting the component for a meat analogue product, such as bacon, through the inlet conduit 60 and inlet aperture 32 in the back plate 28 so that the emulsion or slurry will entirely fill the cavity 30 formed between the assembled front and back plates 26, 28 and be conducted downwardly under low temperature and relatively low pressure, such as in the range of about 1 to 5 psi, towards and through the narrow elongate orifice 54. The positive displacement pump 66 in each conduit 60 will ensure a uniform feed of material or solution from the supply source to the nozzle 12 and maintenance of the required pressure. The pressures may, conceivably, be considerably higher than 5 psi, depending upon the stability and rheological properties of the solution or emulsion and the type of product which is being extruded. The orifice 54 forms a layer from the extruded slurry or emulsion material which is deposited on the upper horizontal run of the conveyor belt 14 which is moving below the orifice 54.

In order to impart a predetermined layer configuration or random pattern to the meat analogue product which will provide an appearance thereto simulating natural bacon, the emulsion passes through the spaces or gaps between the projections 52a and 52b on the insert strip 50; with the resultant deviation in or restriction to the flow of material along various locations along the length of the insert strip 50 causing the extruded layer to assume a predetermined or varying cross-sectional configuration across the width thereof. In effect, at locations where there is a restriction produced by one of the lengthier projections 52a, the extruded layer may be interrupted or discontinuous; whereas, at the location where there is a deviation of the emulsion material away from or towards that location caused by projections 52b, the layer may be either thinner of thicker in cross-section.

Figure 9:
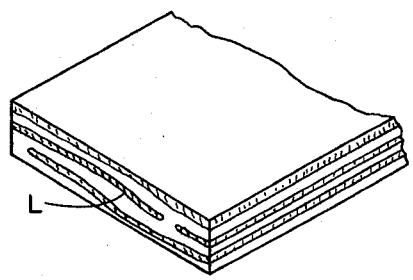
FIG. 9 is a perspective view of portion of a slab of a bacon-like meat analogue product produced in accordance with the present invention.

The insert strip 50 of the subsequent nozzle 12 of the extrusion nozzle arrangement 10 may be provided with a pattern designed so that at a location along the axis of travel of the conveyor belt in which there is formed a restriction in the layer flow caused by a projection 52a or 52b of the insert strip of the preceding nozzle, there may be arranged a flow redirection in the superimposed layer producing an accumulation of additional extruded material which would cause the solution, emulsion or slurry of this subsequent nozzle to fill in the particular gap or restriction in the layer formed by the preceding nozzle. Alternatively, at a location where an excess of material was formed by the insert strip of the preceding nozzle 12, the subsequent nozzle may provide for an obstruction at the insert strip thereof which will reduce or even completely inhibit the flow of slurry or emulsion material at a similar transversely oriented location across the nozzle. Thus, by selecting in a calculated random manner the projections 52a, 52b of the insert strips 50 of sequential or following extrusion nozzles 12, it is possible to provide for a predetermined or random pattern in a controlled manner within the layered extrudates which would, due to the properties of the emulsions of each successive nozzle representive of a particular lean or fat phase or stratum of bacon analogue, produce an appearance of natural bacon during the superimposed deposition of successively extruded slurry or emulsion layers. In the present illustrative instance, the extrusion nozzle arrangement incorporates six successive extrusion nozzles 12 spaced along and extending transversely of the path of movement of the conveyor belt 14, each of which extrudes an emulsion representative of a particular component of the baconlike meat analogue product. Thus, the first nozzle in the arrangement may extrude a solution forming a base layer having an off-white color and which is of a particular consistency, the second fourth, and sixth nozzles 12 may extrude solutions representative of the reddish or lean phase, whereas the third and fifth nozzles may extrude emulsions or solutions evocative of the white or fatty phase of natural bacon. This type of product, as extruded by the extrusion nozzle arrangement 10 is illustrated in FIG. 9 through the fragmentary section of a meat analogue product slab formed by the layered extrudate of the six nozzles 12.

From the foregoing, it becomes readily apparent that the novel extrusion nozzle design allows for a uniform controlled distribution of solutions, slurries or emulsions at a specific feed rate over a wide area while presenting only a low pressure drop in the nozzles. Additionally, the nozzle construction provides for easily disassembling and cleaning, with each nozzle having only one product to extrude, and incorporating a removable insert strip which will facilitate, in a practical manner, the correct flow distribution across the nozzle orifice so as to allow the same nozzle to be utilized for a wide range of applications and flow conditions by simply interchanging the insert strip 50 with another strip. Also, the insert strips may be provided with differing patterns along their lengths in order to compensate for different viscosities, flow rates and rheological properties of the extruded solutions so as to provide for a desired flow distribution across the nozzle orifices. Preferably, the components of the extrusion nozzle 12, with the exception of the insert strip which is generally although not necessarily formed of a plastic material such as Lexan, may be constructed of stainless steel so as to be usable over an extended period of time. Moreover, due to the identical basic construction of each of the extrusion nozzles 12, in the event that any one particular nozzle must be removed from service, either for cleaning or repair, only one reserve nozzle need be held in readiness, into which there can then be inserted an appropriately patterned insert strip and which can readily replace the nozzle being removed from the nozzle arrangement.

Additionally, there are no moving parts in the inventive nozzle arrangement unlike most prior art screw-type extruding nozzle arrangements, which could be subject to wear and would necessitate a considerable period of time for replacement and servicing.

Furthermore, although the above-described inventive extrusion nozzle arrangement has been considered with regard to the fabrication of a meat analogue product, such as simulated natural bacon, it will be readily apparent to one skilled in the art that other types of solutions, slurries and emulsions can be readily employed in connection the inventive extrusion nozzle arrangement; for instance, cake mixes which will form layered cakes or pastries, or layered meat and cheese products. Moreover, the nozzles also readily apply themselves to non-comestible products and to comestible products of various types which are not necessarily meat analogues.

What is claimed is:

1. An extrusion nozzle including a bottom orifice for extruding a continuous layer of a generally viscous solution; said nozzle comprising an upright front plate; an upright back plate, means for clampingly engaging said front plate and said back plate so as to form a solution flow space therebetween; solution inlet means in one said plate communicating with the upper end of said solution flow space and with a supply source for said solution, said orifice being a narrow, elongate slot extending along the bottom surfaces of said front and back plates; and insert means in said nozzle located upstream of and being longitudinally coextensive with said orifice in close proximity therewith, said insert means forming predetermined solution flow directing and restricting means protruding into the flow path of said solution so as to impart a predetermined cross-section to the layer being extruded through said orifice, said front plate and back plate each comprising a generally flat plate having upper surfaces sloping from an upper central point towards a wide bottom surface defining said elongate orifice; a recess formed in the inner wall of one said plate extending along approximately the length of said orifice in parallel relationship therewith, said insert means being positioned in said recess and being clamped between said front and back plates, said insert means being removably arranged in said recess so as to be interchangeable with and replaceable by another insert means.

2. An extrusion nozzle as claimed in claim 1, said insert means forming a patterned cross-section in the layer being extruded through said nozzle orifice.

3. An extrusion nozzle as claimed in claim 1 or 2, said insert means forming an interrupted flow in the layer across the width of said nozzle orifice.

4. An extrusion nozzle as claimed in claim 1, said clamping means comprising a plurality of C-clamps positioned along the sloping upper surfaces of said plates for clamping said front and back plates.

5. An extruson nozzle as claimed in claim 1, said front and back plates each being constituted of stainless steel.

6. An extrusion nozzle as claimed in claim 1, said insert means being constituted of a plastic material.

7. An extrusion nozzle as claimed in claim 1, comprising a generally horizontally movable conveyor belt positioned below said nozzle, said orifice extending transversely across said conveyor belt at a predetermined elevation thereabove so as to deposit said solution in a layer on said conveyor belt.

8. An extrusion nozzle as claimed in claim 7, comprising stationary support means arranged proximate the edges of said conveyor belt; and bracket means being fastened at each end of said nozzle engageable with said support means for mounting said nozzle above said conveyor belt.

9. An extrusion nozzle as claimed in claim 8, each stationary support means comprising a vertically extending pin element; a vertical through-bore being formed in each said bracket means in alignment with and adapted to receive respectively one said pin element; and spacer means on said support means for adjusting the vertical gap between said nozzle orifice and said conveyor belt.

10. An extrusion nozzle as claimed in claim 9, said spacer means comprising a spacer ring slidably mounted on said pin element and having said bracket means supported thereon.

11. An extrusion nozzle as claimed in claim 7, comprising a plurality of said extension nozzles arranged along the path of movement of said conveyor belt in parallel spaced relationships, said nozzles each extruding a layer of solution material in superposition so as to form a multilayered product on said conveyor belt.

12. An extrusion nozzle as claimed in claim 11, each orifice of an extrusion nozzle along the path of movement of said conveyor belt being raised relative to the orifice of a preceding nozzle above said conveyor belt by an extent conforming to at least the thickness of the layer extended by the precedent nozzle.

13. An extrusion nozzle as claimed in claim 11, each said nozzle having one said insert means arranged therein and having solution flow directing and restricting means imparting an extrusion pattern to the layer extruded from the nozzle orifice associated therewith so as to compliment the pattern of the layer extruded from a preceding nozzle orifice in said nozzle arrangement.

14. An extrusion nozzle as claimed in claim 1, said solution comprising an emulsion forming a constituent of a meat analogue product.

15. An extrusion nozzle as claimed in claim 1, comprising pump-means interposed between the solution inlet means and said supply source for effectuating the conveyance of said solution to said inlet means.

16. An extrusion nozzle as claimed in claim 15, said pump means comprising a positive displacement pump.

* * * * *